United States Patent [19]

Perry

[11] 4,297,918
[45] Nov. 3, 1981

[54] CONTROL SYSTEMS FOR STEPLESSLY-VARIABLE RATIO TRANSMISSIONS

[75] Inventor: Forbes G. deB. Perry, Forest Row, England

[73] Assignee: National Research Development Corporation, London, England

[21] Appl. No.: 50,745

[22] Filed: Jun. 21, 1979

[30] Foreign Application Priority Data

Jun. 23, 1978 [GB] United Kingdom ............... 27744/78

[51] Int. Cl.³ ...................... F16H 37/06; F16H 15/00; F16H 13/00
[52] U.S. Cl. .................................... 74/690; 74/190.5; 74/199; 74/200; 74/201; 74/208; 74/796; 74/867
[58] Field of Search ................ 74/690, 201, 796, 867, 74/194, 865, 196, 190.5, 197, 208, 199, 200

[56] References Cited

U.S. PATENT DOCUMENTS

| | | | |
|---|---|---|---|
| 1,943,527 | 1/1934 | Hayes | 74/796 |
| 2,958,234 | 11/1960 | Oehrli | 74/865 |
| 3,184,990 | 5/1965 | Perry | 74/472 |
| 3,242,753 | 3/1966 | Standing et al. | 74/340 |
| 3,276,279 | 10/1966 | Perry et al. | 74/190.5 |
| 3,280,646 | 10/1966 | Lemieux | 74/796 X |
| 3,306,119 | 2/1967 | Perry et al. | 74/208 X |
| 3,406,597 | 10/1968 | Perry et al. | 74/865 |
| 3,548,682 | 12/1970 | Schofield et al. | 74/865 X |
| 3,600,961 | 8/1971 | Rattunde et al. | 74/867 X |
| 3,893,344 | 7/1975 | Dantlgraber et al. | 74/867 X |
| 4,126,052 | 11/1978 | Jackman | 74/200 |

FOREIGN PATENT DOCUMENTS

| | | | |
|---|---|---|---|
| 956311 | 1/1957 | Fed. Rep. of Germany | 74/865 |
| 1025735 | 3/1958 | Fed. Rep. of Germany | 74/200 |
| 2253137 | 5/1973 | Fed. Rep. of Germany | 74/199 |
| 979062 | 1/1965 | United Kingdom | |
| 1078791 | 8/1967 | United Kingdom | |
| 1195205 | 6/1970 | United Kingdom | 74/199 |
| 12809987 | 7/1972 | United Kingdom | 74/200 |

Primary Examiner—Leslie Braun
Attorney, Agent, or Firm—Cushman, Darby & Cushman

[57] ABSTRACT

A steplessly variable ratio transmission unit with swingable rollers (11, 12) interconnecting input and output toroidal discs (1, 2, 10), the swing of the rollers (11, 12) being controlled by a ratio actuator (146, 148) supplied by a pump (174) at a pressure controlled by a ratio valve (186). At an end of the stroke of the ratio actuator an end-stop valve (150) is actuated to constrict the flow to the ratio valve (186), and the raised pressure up-stream of a constriction (140, 142) in valve 150 acts on a piston (140) of that valve urging the ratio actuator (146, 148) away from the end of its stroke so that the rollers (11, 12) cannot run off the discs (1, 2, 10). A complete transmission system provides a First Regime with recirculation in planetary gearing and a Second Regime with drive through the transmission unit alone. In First Regime, at the lowest transmission unit ratio, that ratio and the overall system ratio are the same. The gearing comprises a "mixing" epicyclic gear (76) with pairs of meshed planet pinions (80, 126) and a simple "matching" epicyclic gear (107) the annuli (78, 113) whereof are coupled together, the transmission unit (1, 2, 10, 11, 12) being bridged across the sun gears (75, 108), the system output (104) being taken from the mixing epicyclic planet carrier (77). The matching epicyclic planet carrier (110) is "earthed" via a sprag (115, 118) to establish First Regime. A Second Regime clutch (89) locks up the mixing epicyclic whereupon the sprag (115, 118) overruns to release First Regime automatically.

6 Claims, 9 Drawing Figures

CONTROL SYSTEMS FOR STEPLESSLY-VARIABLE RATIO TRANSMISSIONS

This invention relates to a control system for a steplessly-variable ratio transmission unit of the type having an input disc and an output disc which have facing surfaces forming part of a torus and which are mounted for rotation about a common main axis there being at least one roller between and in driving engagement with the toroidal surfaces of the discs, the or each roller having a mounting permitting it to swivel about a ratio-change axis substantially tangential to the centre circle of the torus of which the disc surfaces form part whereby the speed ratio between the input disc and the output disc may be changed, the roller mounting also permitting limited bodily translation of the roller substantially along the line of the ratio axis whereby a change of the said ratio is initiated, the torque reaction to which the or each roller is subjected in the course of transmitting torque from the input disc to the output disc being resisted by a ratio actuator which thus controls the said ratio and with an end-load actuator urging the input disc and the output disc together into driving engagement with the or each roller.

According to the invention there is provided a control system for a transmission unit of the type described in which the ratio actuator and the end-load actuator are hydraulic devices supplied from a source of fluid at potentially high pressure, comprising a ratio control valve operable to reduce the pressure from the source to a required extent to produce a required ratio by means of the ratio actuator and a corresponding end-load on the discs by means of the end load actuator characterised by end-stop valve means comprising a movable member mechanically operable by the ratio actuator at or near to one end at least of its permissible stroke, to constrict the fluid connection to the ratio control valve so that the fluid pressure from the said source is no longer solely under control of the ratio valve, and rises upstream of the constriction the fluid pressure from the source being introduced into a cylinder space of the end stop valve occupied by the movable member, the said rising pressure acting on a piston face of the movable member in a sense urging the ratio actuator away from the end of its stroke, when the movable member is operated as aforesaid, the end load actuator being connected to the pressurised fluid source upstream of the end stop valve means.

The said cylinder space and piston surface may respectively take the form of a valve chamber and a spool which co-operate to constrict the fluid connection to the ratio control valve when the movable member is operated as aforesaid.

Two end stop valve means may be provided, one operable by the ratio actuator at one end of its stroke and the other operable by the ratio actuator at the other end of its stroke.

Two such end stop valve means may be combined into a single valve operable at each end of the stroke of the ratio actuator.

In a preferred form of the end stop valve means the movable member takes the form of a spool housed in a chamber defining two cylinder spaces, one at each end of the spool and into which the spool presents opposed piston faces of substantially equal area, pressurised fluid entering one of such cylinder spaces which also has an exit port leading to the ratio valve, the movable member at least partly covering the exit port when operated by the ratio actuator at the end of its stroke. The exit port also communicates with the other cylinder space so that the pressures acting in opposite directions on the two piston faces of the movable member are equal when the exit port is unobstructed. As the exit port is progressively obstructed on operation of the movable member by the ratio actuator (as aforesaid) a pressure differential builds up across the movable member resisting its movement and consequently resisting the movement of the ratio actuator towards the end of its stroke. The said piston faces of the movable member should each have an area equal to or a little less than the effective piston area of the ratio actuator.

The rising pressure upstream of the exit port is applied to the end load actuator.

The invention will be described in detail in an embodiment designed for use with a system in which a planetary gear train is combined with the variable ratio unit in a power-recirculating configuration the ratio of the planetary train being such that, at an intermediate ratio of the variable unit, no torque is transmitted to the load, variation of the ratio of the variable unit in one sense rotating the load in one direction ("forward") and in the opposite sense rotating the load in the opposite direction ("reverse") in a First Regime.

The direction chosen for "forward" drive in the First Regime is that in which the ratio of the variable unit is lowered to raise the overall ratio and there is a ratio near to the lower end of the ratio range of the variable unit when the overall ratio is the same as the ratio of the variable unit. It is then possible to disconnect the power recirculation configuration of the First Regime and connect the output of the variable unit to the load directly, to provide a Second Regime, the ratio of the variable unit then being raised over its full range of variability to provide an extension of the ratio range of the system as a whole.

Such systems are described in detail in U.K. Patent Specification No. 1,078,791 and the system outlined above is called a "synchronous" system in that specification as distinct from an "a-synchronous" system in which, in the First Regime the ratio of the variable unit is raised to drive the load "forward" in that Regime and where, to change to the Second Regime, the ratio of the variable unit has to be swept downwards from one end to the other of the ratio range to provide a ratio equal to the highest "forward" ratio of the First Regime.

The invention is not confined to use with a two-regime system as described above but may be used with a system having only one regime, the output member of a variable ratio unit of the type described, being connected to the load, with a clutch or the like for starting from rest and with an end load actuator energised by the same fluid pressure as is applied to the ratio actuator.

In a two-regime system, in another of its aspects, the invention provides a variable-ratio transmission system for coupling a prime mover to a load, the system comprising a variable ratio transmission unit, (thereinafter called the "variable unit") the ratio of which is continuously variable over a range of ratios not including zero, the input of the variable unit being adapted for rotation in one direction only and the direction of rotation of the output of the variable unit being the opposite of the direction of rotation of the input, the variable unit being combined with a three-element planetary gear train (hereinafter called the "mixing train"), having a sun gear, an internally-toothed annulus gear, and a planet carrier on which are journalled at least one pair of planet pinions, one pinion of a pair meshing with the sun gear, another pinion of the pair meshing with the annulus gear and the two pinions of the pair meshing with one another, the output of the variable unit being coupled to the sun gear, the planet carrier being coupled to the output of the transmission system and the annulus gear being coupled to the input of the variable unit via a second planetary gear train (hereinafter called the "matching train"), the matching train having a sun gear, an internally-toothed annulus gear, and a planet carrier upon which there is journalled at least one planet pinion, the or each of such planet pinions meshing with the sun gear and the annulus gear, the sun gear of the matching train being coupled to the input of the variable unit, the annulus gears of the mixing train and the matching train being coupled together and the planet carrier of the matching train being coupled to a fixed part of the system via a unidirectional brake which prevents the planet carrier from rotating when the tooth speed of the sun gear would exceed the tooth speed of the annulus gear but permits rotation of the carrier when the tooth speed of the annulus gear exceeds the tooth speed of the sun gear, sun/annulus tooth ratios of the mixing train and the matching train being so chosen that at a predetermined intermediate ratio of the variable unit, no torque is transmitted to the output of the system and so that, at a ratio near to the low ratio end of the ratio range of the variable unit, the speeds of the output of the variable unit and of the output of the system are the same, the system further comprising engageable/disengageable clutch means for coupling the output of the variable unit to the output of the system, whereby the system can operate in either of two regimes, a First Regime with the said clutch means disengaged and the system operating in a recirculatory mode and a Second Regime, with the said clutch means engaged and the said unidirectional brake overrunning to disable the recirculatory mode and the output of the system being driven by the output of the variable unit without recirculation through the mixing train and the matching train. Preferably means are provided for locking the unidirectional brake to prevent rotation of the planet carrier of the matching train in either direction so that the load can be rotated in either direction in the First Regime.

The invention will be more readily understood from the following description of certain embodiments thereof illustrated in the accompanying drawings in which.

Figure 1:
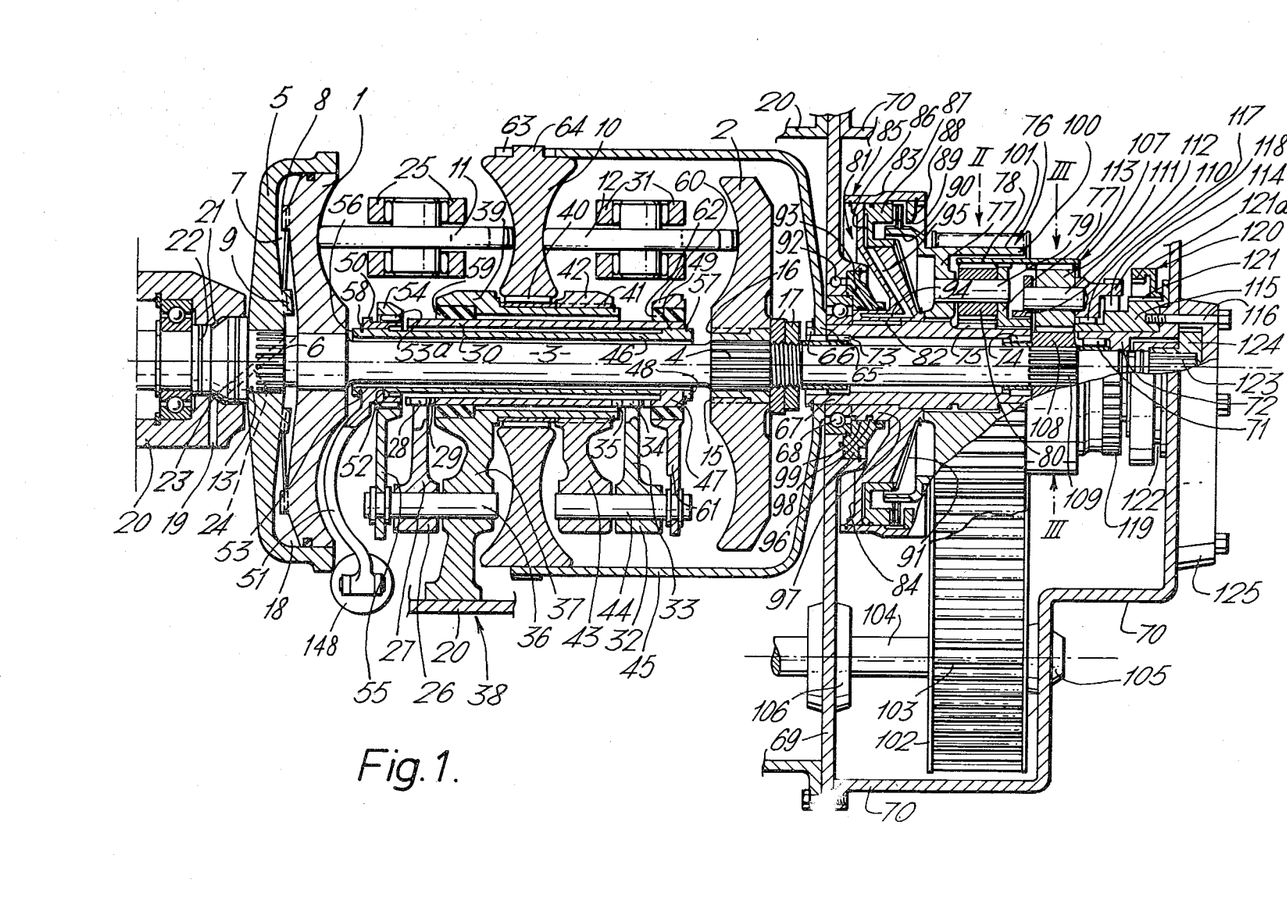
FIG. 1 is a section in a plane containing the main axis of the mechanical parts of a transmission system as described above.

The transmission unit illustrated in FIG. 1 comprises two input discs 1 and 2 mounted on an input shaft 3. Disc 2 is restrained from rotation relative to shaft 3 by splines 4. Disc 1 is received within a cylinder 5 which is restrained from rotation relative to shaft 3 by splines 6. A conical spring 7 bears against disc 1 and cylinder 5 urging them apart. Spring 7 has outer tongues which engage gaps in a circumferential ridge 8 on the left hand face of disc 1 and inner tongues which engage gaps in a circumferential ridge 9 on the right hand face of cylinder 5. These two sets of tongues and ridges restrain disc 1 and cylinder 5 from relative rotation and as the latter is splined (by splines 6) to shaft 3, disc 1 is also restrained from rotation relative to shaft 3.

The facing sides of discs 1 and 2 are each formed as part of a torus. Between discs 1 and 2 is an output disc 10 which is formed as part of a torus on each side of its sides.

Rollers such as 11 provide a driving connection between the opposed toroidal surfaces of discs 1 and 10. Rollers such as 12 provide a driving connection between the opposed toroidal surfaces of discs 2 and 10. The two sets of rollers (such as 11 and such as 12) provide parallel drive paths from the input shaft 3 to the output disc 10.

Cylinder 5 bears against a shoulder 13 on shaft 3. Disc 2 fits over a collar 15 and is restrained from rotation relative to collar 15 by splines 16, collar 15 being in turn restrained from rotation relative to shaft 3 by splines 4. Nuts 17 restrain collar 15 and disc 2 from axial movement rightwards along shaft 3. The assembly nuts 17 are tightened to impose a predetermined preload on spring 7 forcing the toroidal surfaces of discs 1, 10 and 2 together into driving engagement with the rollers such as 11 and 12 with a force sufficient for the transmission of light loads only. For the transmission of heavier loads a larger force urging the discs against the rollers, is provided by disc 1 acting as a piston in cylinder 5 between which there is a cylinder space 18 into which pressurised fluid is introduced through a duct 19 in the casing 20 (only parts of which are shown), leading from a pump (not shown). Duct 19 delivers into an annular space 21 between shaft 3 and the surrounding casing 20, flanked by seals 22 and 23. A passage 24, shown in dotted lines, leads from space 21 to cylinder space 18 and pressurised fluid at a pressure which is controlled by a valve system to be described below, applies an appropriate force urging the discs 1 and 2 together upon rollers such as 11 and such as 12 and upon disc 10.

The rollers such as 11 are each supported in a roller carrier such as 25, each of these carriers being attached to a rocker lever such as 26 by means of one arm of the rocker lever (not shown), each rocker lever having another arm such as 27 extending radially inwards towards input shaft 3. The end of each arm such as 27 terminates in a bead such as 28 which rides in a slot such as 29 in one end of a control sleeve 30. Each rocker lever such as 26 is fulcrumed upon a pin such as 36, supported by an arm such as 37 of a spider member whose arms are fixed to casing 20 at their outer ends (as at 38) and the inner ends of the arms are integral with a sleeve 39 which extends through the centre of disc 10 and supports the inner race of a needle roller bearing 40 for disc 10.

The rollers such as 12 are each supported in a carrier such as 31, each of these carriers being attached to a rocker lever such as 32 by means of one arm (not shown), each rocker lever having another arm such as 33 extending radially inwards towards input shaft 3. The end of each arm such as 33 terminates in a bead such as 34 which rides in a slot such as 35 in the other end of control sleeve 30.

The right hand end of sleeve 39 terminates in splines 41 which mate with interior splines on a spider ring 42 from which integral radial spider arms such as 43 extend and at their outer ends support pins such as 44 upon which are fulcrumed the rocker levers such as 32.

As the output from disc 10 is taken by means of a bell 45, the spider arms such as 43 cannot be fixed to the casing 20 at their outer ends and the spider assembly 42, 43 is supported solely by sleeve 39.

Control sleeve 30 can float both radially and axially being held in place by the torque reaction forces applied to the slots such as 29 and 35 by the beads such as 28 and 34 of the rocker levers.

Each of the rollers such as 11 is one of a set of three, each of which has a carrier such as 25 and a rocker lever such as 26 and the beads such as 28 are spaced at equal intervals around control sleeve 30. If the rollers are not all in the same ratio attitude they will apply different torque reaction loads to control sleeve 30 which will then shift laterally and the resulting differential motions imparted to the rocker levers such as 26 tend to produce changes of ratio attitude on the part of the rollers such as 11 to equalise their torque reaction loads. The geometry of such equalisation motions is fully explained in U.K. Patent Specification No. 979,062 and is in fact well known in the art.

The immediately preceding paragraph applies, mutatis mutandis, to rollers such as 12.

The slots 29 and 35, in control sleeve 30 are long enough to accommodate a certain amount of axial movement of sleeve 30 and these slots are slanted out of a plane containing the axis of rotation of shaft 3 the slant of slots 29 being of opposite sense to that of slots 35.

If the torque reaction forces applied to control sleeve 30 by the set of rollers such as 11 differ from those applied by the set of rollers such as 12, due to the slanting of the slots 28 and 35 the beads such as 28 and 34 apply an axial force to control sleeve 30 resulting in differential motions of rocker levers such as 26 on the one hand and the rocker levers such as 32 on the other hand, the sense of these motions being such as to change differentially the ratio attitudes of rollers such as 11 and of the rollers such as 12 in senses tending to equalise the torque reactions of the two sets of rollers. Again the geometry of these equalisation motions is well known and is described in more detail in the said U.K. Specification No. 979,062.

Control sleeve 30 is rotated to produce a change in the ratio attitudes of all the rollers so as to change the overall ratio of the transmission unit. In the transmission unit illustrated in FIG. 1 rotatory motions of control sleeve 30 are controlled by means of an inner sleeve 46 which surrounds shaft 3 and is separated therefrom and from control sleeve 30 by clearances sufficient to accommodate radial roller-to-roller load equalisation motions of control sleeve 30. Inner sleeve 46 is coupled to the right hand end of control sleeve 30 by means of tongues such as 47 formed on the latter sleeve which extend radially inwards to engage slots such as 48 in inner sleeve 46. Tongues 47 are barrelled slightly in profile to accommodate relative rocking motions of sleeves 30 and 46 in the course of radial equalisation motions. Between slots 48, inner sleeve 46 is thickened, as seen at 49, to fill the gap between the two sleeves and the outer profile of these thickened regions is also barrelled to accommodate the said relative rocking motions.

The left hand end of inner sleeve 46 is embraced by a collar 50 which is integral with a control lever 51. Collar 50 has inwardly extending tongues such as 52 (also barrelled as tongues 47) which engage slots such as 53 in sleeve 46. Collar 50 is supported for rotation in needle roller bearings 53a within a spider ring 54 which has integral spider arms such as 55, the outer ends of which are threaded over pivot pins such as 36. The left hand end of inner sleeve 46 is thickened, as at 56, between slots such as 53, to make contact with the inner surface of collar 50 and is thus restrained from radial motion which might otherwise arise from rotational forces applied via lever 51.

The thickened regions such as 56 are barrelled as with the thickened regions such as 49 at the other end of inner sleeve 46.

Inner sleeve 46 and control sleeve 30 are restrained from relative axial motion by a spring ring 57 and inner sleeve 46 and collar 50 are similarly restrained from relative axial motion by a spring ring 58, so that when control sleeve 30 shifts axially in the course of load equalisation action between the two sets of rollers, the whole assembly of control sleeve 30, inner sleeve 46 and collar 50 move axially as one, the outer surface of collar 50, which engages the needle rollers such as 53, being wide enough in the axial direction, to accommodate such motion.

Inner sleeve 46 by reason of the barrelling of tongues 47 and 52, can cant in any radial direction when the right hand end of control sleeve 30 shifts radially in the course of load equalisation between the rollers such as 12. The left hand end of control sleeve 30 is also free to shift radially in the course of load equalisation between the rollers such as 11.

There is a tendency for oscillation in radial directions of the ends of control sleeve 30 and for axial oscillation also of control sleeve 30.

To restrain such oscillations the main spider sleeve 39 is enlarged internally at its left hand end so as to leave an annular gap surrounding control sleeve 30 to receive a damper in the form of a flexible envelope filled with viscous fluid this damper being indicated diagrammatically at 59.

The right hand end of control sleeve 30 is surrounded by a spider ring 60 which has integral radially outwardly extending spider arms such as 61, the outer ends of which are supported on the outer ends of the rocker lever fulcrum pins such as 44. The annular space between control sleeve 30 and spider ring 60 accommodates another damper 62 similar to damper 59.

The output bell 45 has slots such as 63 at intervals around the mouth of the bell (at the left hand side thereof in FIG. 1) and these slots receive projections such as 64 on the outer edge of output disc 10 to transmit the drive from this disc to output bell 45.

At its other end, output bell 45 has inwardly extending tongues such as 65 which engage slots such as 66 in a sleeve 67. Sleeve 67 is supported at its left hand end by a ball bearing 68 mounted in a diaphragm 69 secured between front casing 20 and a rear casing 70 (only parts of which are shown). The input shaft 3 extends through sleeve 67 to the left hand end of casing 70 where it is supported by a needle roller bearing 71 within a leftwardly extending boss 72 integral with casing 70.

Sleeve 67 is supported on input shaft 3 by needle roller bearings 73 and 74 at each end. Near to the right hand end of sleeve 67 it is provided with gear teeth 75 which form the sun wheel of an epicyclic gear train 76, the "mixing train", shown in cross section in FIG. 2. Gear train 76 also has a planet carrier assembly 77 and an internally-toothed annulus 78. Planet carrier 77 carries axle pins such as 79 upon which run planet pinions such as 80.

A clutch body 81 is mounted on sleeve 67 and restrained against revolution relative thereto by splines 82. A sleeve 83 is secured to an outer flange 84 of the clutch body 81 by splines and a spring ring at 85. Sleeve 83 has a cylindrical inner surface over the part nearest to point 85 which forms one wall of an annular cylinder space 86. An outer cylindrical surface formed on clutch body 81 forms another wall of cylinder space 86. An annular piston 87 is received within cylinder space 86, and a rightwards-facing annular surface of piston 87 co-operates with a presser ring 88 to force clutch plates 89 into mutual engagement when pressurised fluid is introduced into cylinder space 86. One set of these clutch plates is anchored by splines to sleeve 83 and the other (interleaved) set is anchored by splines to a leftwardly-extending sleeve 90 of planet carrier 77. A conical spring 91 urges piston 87 into cylinder space 86 to disengage clutch plates 89. Pressurised fluid may be introduced into cylinder space 86 via a drilling 92 in diaphragm 69 and ducts 93, 94 and 95, drilling 93 running inwardly through a ring member 96 fixed to diaphragm 69, and drillings 94 and 95 passing through clutch body 81 to cylinder space 86. A leftwards tubular extension 97, of clutch body 81 passes within ring member 96. Extension 97 has a groove 98 machined in its outer surface and duct 93, flanked by ring seals 99 meets this groove 98 which communicates with duct 94.

When pressurised fluid is applied, via the items 92, 93, 98, 94 and 95 described above, to cylinder space 86, piston 87 closes on clutch plates 89 and locks together the sun 75 and the planet carrier 77 of epicyclic gear train 76 which therefore rotates as one, effectively coupling the output disc 10 of the variable unit directly to the output of the system. Planet carrier 77 has a rightwardly extending tubular member 100 which surrounds annulus gear 78 and this member 100 is provided, around its outer surface, with sprocket teeth 101 which mesh with a drive chain 102 which also meshes with a driven sprocket wheel 103 which is coupled to an output shaft 104, carried in bearings 105 and 106 mounted in casing 70 and diaphragm 69 respectively.

A second epicyclic planetary gear train 107, the "matching train", is provided. It consists of a sun wheel 108 rotationally anchored to input shaft 3 by splines 109, a planet carrier 110 equipped with planet pinions such as 111 which rotate on axle pins such as 112, and an internally toothed annulus gear 113 which is integral with annulus gear 78 of epicyclic train 76.

Planet carrier 110 has a rightwardly extending tubular element 114 which surrounds tubular item 115 which in turn fits over boss 72 and is secured to casing 76 by means of bolts such as 116. A cylindrical surface of item 115 provides the inner race of a needle roller bearing 117 on which runs planet carrier 110. A larger cylindrical surface of item 115 is spaced from the inner cylindrical surface of tubular element 114 to leave an annular gap occupied with the sprag elements such as 118 of a unidirectional brake which only permits planet carrier 110 to rotate in one direction.

The outer surface of tubular element 114 is provided with dogs 119. A flanged element 120 has a leftwardly extending tubular section 121 which has dogs capable of meshing with dogs 119 when element 120 is moved to the left.

Element 120 is anchored against rotation by internal splines which mesh with external splines 121a on tubular item 115. A circumferential groove 122 is provided on flanged element 120 which is embraced by a styrup (not shown) by which it can be moved into and out of engagement with plant carrier 110. The purpose of this will be explained below.

Input shaft 3 extends rightwardly through casing 70 and its end is provided with splines 123 which penetrate within and mesh with internal splines of a gear wheel 124 which forms part of a gear pump within a pump casing 125 bolted to the outside of casing 70.

Figure 2:
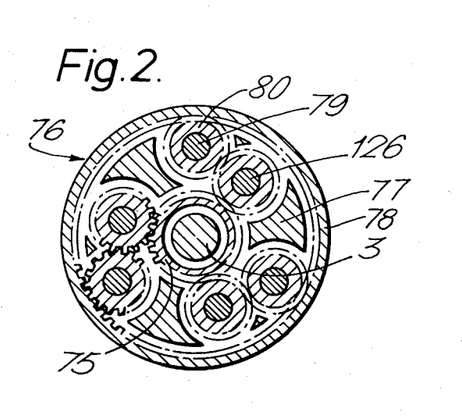
FIG. 2 is a cross section of the system shown in FIG. 1 at the position marked "II" in FIG. 1.

FIG. 2 shows details of epicyclic gear train 76: the mixing train. The reference numerals used in FIG. 1 are used again in FIG. 2 to denote corresponding items.

Gear train 76 has three pairs of planet pinions only one of which pairs will be described. One planet pinion 80 meshes with annulus gear 78 and the other planet pinion 126 meshes with sun wheel 75. Planet pinions 80 and 126 mesh with one another. Tubular member 100 is omitted to simplify the drawing.

Figure 3:
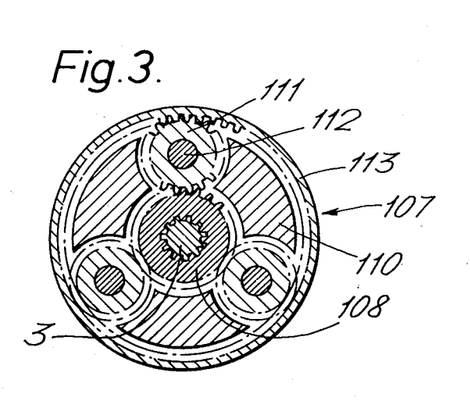
FIG. 3 is a cross section of the system shown in FIG. 1 at the position marked "III" in FIG. 1.

FIG. 3 shows details of epicyclic gear train 107: the matching train. Here again the reference numerals of FIG. 1 are used for corresponding items.

Gear train 107 is a simple epicyclic train having three planet pinions such as 111 mounted on axle pins such as 112 on the planet carrier 110, each pinion meshing with the sun wheel 108 and the annulus 113.

Figure 4:
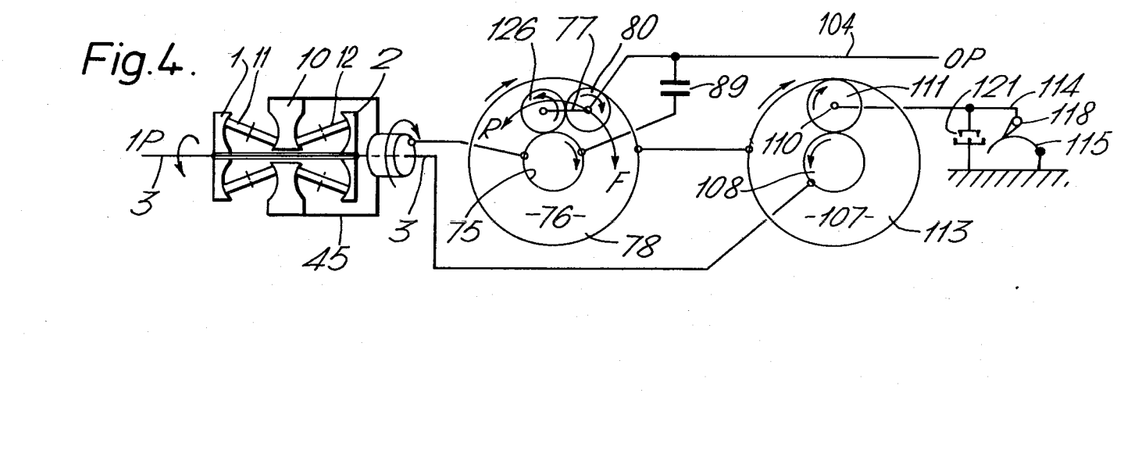
FIG. 4 is a schematic diagram of the transmission system shown in FIG. 1.

The working of the system as a whole can best be described in relation to the schematic diagram of FIG. 4.

FIG. 4 makes use of the following conventions:

A planetary gear train is represented by two concentric circles representing the sun and annulus respectively. A further circle or circles, between these two circles and tangent to one or both of them, represent planet pinions. A shaft connection to a gear wheel rotating with the shaft is shown as a line terminating with a dot on the circumference of the circle representing the gear wheel and a shaft connection to a planet carrier rotating with the shaft is shown as a line terminating in a dot in the centre of the circle representing a planet gear mounted on the carrier. A clutch or brake is represented by short thick parallel lines intersecting the line representing a shaft or the like interconnecting items to be connected or disconnected by the clutch or brake. This symbol is the same as that used to denote a capacitance in an electrical circuit diagram. A unidirectional clutch or brake is represented by a circle or an arc of a circle and a wedge (indicating a pawl) the slope of which indicates the direction of engagement of the clutch or brake. A connection to the part of the unidirectional clutch or brake represented by the circle or arc are indicated by a line terminating in a dot on the circumference of the said circle or arc. A connection to the part of the said clutch or brake represented by a wedge is shown as a line terminating in a dot in the thick end of the wedge. Directions of rotation are indicated by arcuate arrows. As shafts and gears may rotate in one direction in some circumstances and in the opposite direction in other circumstances, arrows indicating directions of rotation hold good in circumstances which are specified in the description, but do not necessarily hold good in other circumstances. The symbol used to indicate a toroidal race variable ratio transmission unit is self-explanatory.

The input shaft 3, rotating anticlockwise, rotates sun wheel 108 of planetary train 107 anticlockwise. Planet carrier 110 would also rotate anticlockwise were it not for the unidirectional brake 118/115 by which it is held fast to the casing. Planet pinion 111 is therefore rotated clockwise turning annulus 113 clockwise also at a speed reduction equal to the sun/annulus tooth ratio of train 107. As annulus 78 of train 76 is integral with annulus 113 the two rotate together clockwise at a speed slower than that of input shaft 3.

Output bell 45 of the variable ratio unit, which rotates in the opposite direction from that of input shaft 3, is connected to sun wheel 75 of train 76. Both sun and annulus of train 76 are rotating in the same direction, i.e. clockwise. If they were rotating with the same "tooth speed" no torque would be transmitted to carrier 77 since pinions 126 and 80 would roll idly upon one another (the former anticlockwise, the latter clockwise). For this to be so sun wheel 75 must rotate faster than annulus 78 by the annulus/sun tooth ratio of train 76. As however annulus 78 is rotating slower than input shaft 3 by the sun/annulus tooth ratio of train 107 if the ratios of trains 76 and 107 were equal, the variable unit ratio would have to be 1:1 for zero torque on carrier 77. In the system under consideration a ratio somewhat higher than 1:1 is adopted for the ratio of zero torque on carrier 77 which will be called the neutral ratio.

If the variable unit ratio is lowered from the neutral ratio the "tooth speed" of sun wheel 75 lags behind that of annulus 78 and torque starts to be transmitted to carrier 77 in the clockwise direction. This is the same direction as that of output bell 45 of the variable unit and it is the direction designated "forward", being the direction which will obtain in the Second Regime when output bell 45 is connected to the carrier 77 by the engagement of clutch 89.

With the variable unit neutral ratio higher than 1:1 the sun/annulus ratio of train 76 must be smaller than the corresponding ratio of train 107.

As the ratio of the variable unit is lowered to a point near to the end of the range a point is reached at which the rotational speed of sun wheel 75 is the same as that of carrier 77. If at this time clutch 89 is engaged all three elements of train 76 rotate together clockwise. This is called the "synchronous" ratio of the variable unit.

With train 76 locked by clutch 89 to rotate as one unit then the variable unit ratio must be the inverse of the ratio of train 107 if the system is not to become locked by brake 118/115. As the ratio of the variable unit is raised in the Second Regime annulus 113 rotates faster and its tooth speed overtakes that of sun 108 so that carrier 110 is urged clockwise whereupon unidirectional brake 118/115 overruns and allows the Second Regime configuration to be adopted automatically on engagement of clutch 89.

Conversely with the variable ratio unit falling in the Second Regime, when the synchronous ratio is reached, carrier 110, having been rotating clockwise, now comes to rest. On release of brake 89 the conditions of the First Regime are resumed and the ratio of the variable unit must now be raised to continue the lowering of the overall ratio.

On changing from one regime to the other there is a change in the direction of the torque reaction in the variable unit and it is necessary to reverse also the direction of action of the ratio actuator at the moment of regime change.

When the ratio of the variable unit, in the First Regime, is raised from the neutral ratio, carrier 77 would be driven anticlockwise but for the fact that the torque on carrier 110 then becomes clockwise so that unidirectional brake 118/115 overruns and breaks the drive path. For "reverse" rotation of carrier 77 therefore it becomes necessary to bridge brake 118/115 by dogs 121.

Figures 5, 6, 7:
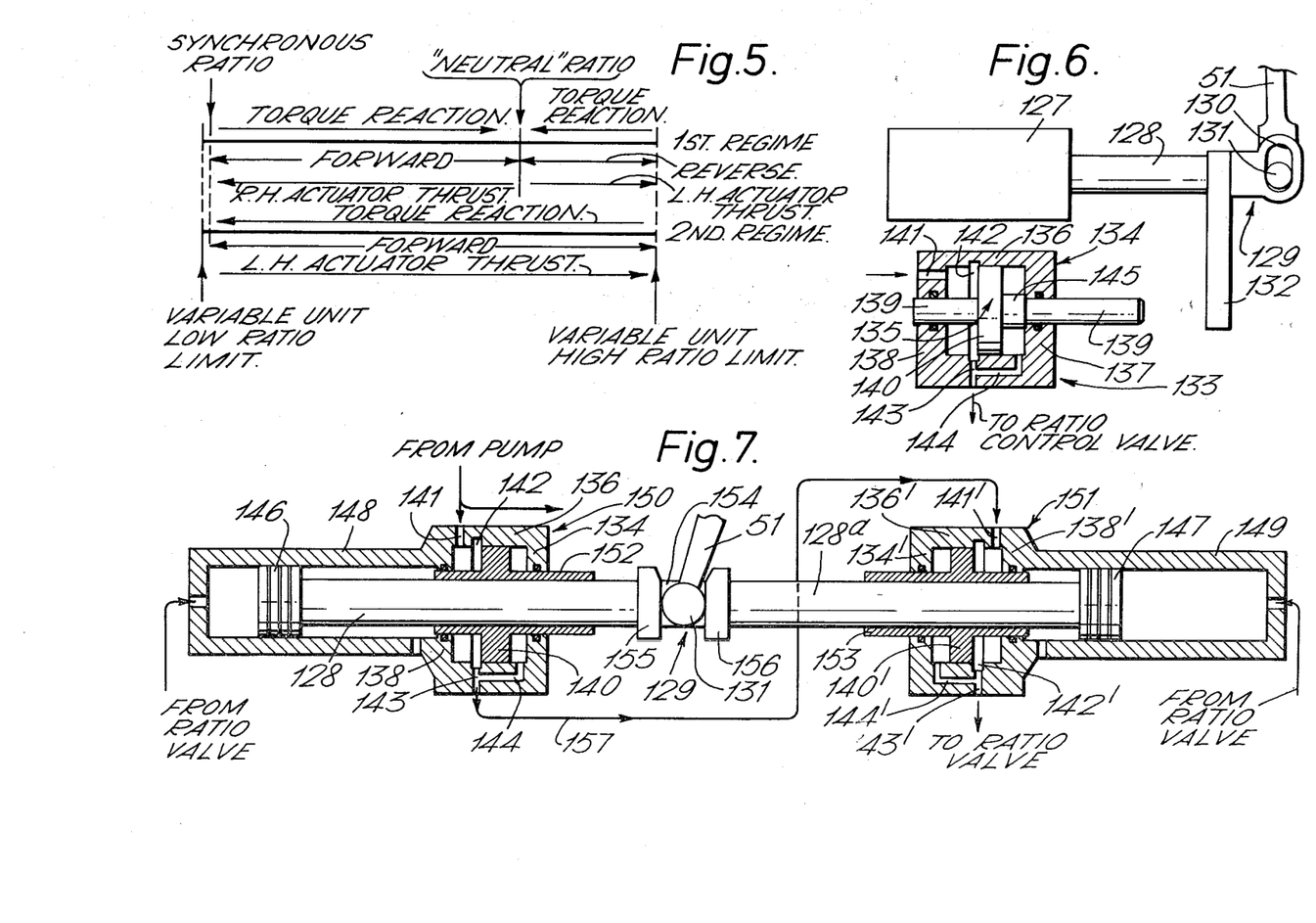
FIG. 5 is a diagram showing the directions of the forces acting on the roller mountings of a system as shown in FIG. 1, in various conditions of operation.
FIG. 6 shows one form of end stop valve according to the invention.
FIG. 7 shows an alternative form of end stop valve according to the invention.

FIG. 5 shows diagrammatically the directions of torque reaction and ratio actuator force in the various stages in the First and Second regimes.

It is vitally necessary to ensure that in no circumstances can the rollers run to ratio angles which would cause them to run off the toroidal faces of the discs.

The conditions in which this is most likely to happen can best be seen from a study of FIG. 5. Those conditions where torque reaction at the roller mountings is urging the ratio actuator towards one end of its stroke, are the most likely to lead to overshoot of the rollers. In Second Regime, with a falling ratio, these conditions obtain near to the left hand end of the diagram. The torque reaction, which is proportional to the sum of the input torque and the output torque of the transmission unit, is rising, assuming constant input torque. To initiate a fall in ratio, the ratio actuator force (acting leftwards), must fall momentarily but thereafter must rise to resist the rising torque reaction. Near to the lowest ratio there is a risk of the rollers overshooting. It is difficult in practice to eliminate this risk by means of the ratio control circuit and in any event this would provide no protection in the event of pump failure, valve malfunction or the like.

Under all other conditions, as shown in FIG. 5, the extremes of ratio are approached against the resistance of torque reaction (which is falling), urged by control pressure (which is also falling) in the ratio actuator. If control pressure fails for any reason torque reaction urges the ratio away from the extremes of the range. It is not difficult to ensure, by means of the ratio control circuit, that the ratio actuator does not persist in raising the ratio to the danger point of roller overshoot.

There remains one factor however which could cause roller overshoot even at the high overall ratios. When the operator cuts the fuel supply of the prime mover (by "throttling back") there is a reversal of the direction of torque reaction and this urges the rollers towards the high ratio end(s) of the range.

It is possible to provide positive mechanical stops on the ratio actuator or the linkages between it and the rollers and this is a satisfactory solution where the end load forcing discs and rollers into driving engagement is provided otherwise than by means of an hydraulic actuator supplied with the same ratio control pressure as that supplied to the ratio actuator.

Energising the end-load actuator from the ratio control pressure is justified by the fact that, assuming a constant effective coefficient of traction between roller and disc surfaces, the end load required to ensure driving engagement, without substantial slip, is proportional to the torque reaction to which the rollers are subjected, and the further fact that, for a stable ratio, the fluid pressure in the ratio actuator is proportional to this torque reaction.

The proportionality factor between roller torque reaction and end load force required to support that torque reaction without substantial slip is dependent on a number of factors which can be calculated for any given geometry of the variable ratio unit or in the last resort determined by trial and error.

The proportionality factor chosen in determining the effective piston area of the end load actuator and the pressures of the fluid supplied to it must be to some extent a compromise because, for instance, the effective normal load at the disc/roller surfaces, for a given actuator force varies according to the ratio attitudes of the rollers, being greater at ratios away from the 1:1 ratio due to a cosine effect; also the effective coefficient of traction between the roller and disc surfaces is not constant and falls somewhat at high rolling speeds; some correction for the latter effect is inherent in a rotating end-load actuator due to centrifugal force acting on the fluid in the actuator.

No simple method of tailoring the end-load force to correct for the cosine effect mentioned above, has yet emerged and though it is inherently possible to correct for this in the control circuit, the correction must be confined to the end-load actuator pressure and must not affect the ratio actuator pressure.

Having chosen a compromise value for the torque reaction/end load force proportionality factor and determined the size of end-load actuator and the pressures required to be applied to it, the effective piston area of the ratio actuator required to support the torque reaction forces existing at the end of the roller support linkage which make contact with the actuator, must then be determined for the same range of fluid pressures as were chosen for the operation of the end load actuator.

When these parameters have been determined, the control pressure used for ratio control via the ratio actuator may be applied to the end-load actuator and will provide an end-load force which is sufficient to secure driving engagement between rollers and discs in all circumstances though due to the compromises outlined above the end-load must exceed the minimum required disc/roller normal load in certain condition, (e.g. in ratios away from the 1:1 ratio).

The relevance of the above passages will be apparent when the design of an end-stop valve is discussed below.

FIG. 6 shows an end-stop valve according to the invention in its basic form.

A ratio actuator 127 has a piston rod 128 terminating in a cross-head 129 which is slotted at 130 to receive a peg 131 attached to the lever 51 of the roller control linkage (see FIG. 1).

Projecting laterally from cross-head 129 is a bar 132 by which the end-stop valve, generally denoted 133, is operated by actuator 27 as it approaches the left hand end of its stroke.

Valve 133 comprises a valve body 134, containing a movable valve member 135.

Valve body 134 is drawn diagrammatically in that it does not show how movable member 135 can be got inside it. The same applies to various items of the later FIGS. 7 and 8. In a practical design, of course, the items in question would have to be in two or more separate parts bolted together or fixed together in any convenient way. It is not considered necessary to illustrate such details of construction as they are well within the competence of those skilled in the art.

Returning to FIG. 6, the valve body 134 has a cylindrical centre section 136, and two end walls 137 and 138 which are pierced to receive a central rod 139 of the movable member 135. Integral with, or fixed to rod 139, and between its ends is a disc member 140 which is a close fit within cylindrical section 136. End wall 138 has an entry port 141 through which pressurised fluid is introduced into the interior of valve 133 to the left of disc member 140. Also to the left of disc member 140 a groove 142 is cut around the inner wall of cylindrical section 136. From groove 142, an exit port 143 leads to the exterior of valve body 134. A transfer port 144 runs rightwards through the thickness of cylindrical section 136 and upwards into the interior of valve body 134 to the right of disc member 140.

With the valve in the attitude shown in FIG. 6 the pressure on both sides of disc member 140 is equal and as they present equal effective piston areas to this pressure, the movable member 135 is neutrally balanced along its axis. Part of rod 139 to the right of disc member 140 is shown, at 145, as having a slightly larger diameter than the ends of the rod which pass through end walls 137 and 138. This acts as a stop to locate movable member 135 in a convenient rest position, but it does not affect the pressure balance on the two sides of disc member 140 as the enlarged portion is "nicked" in various places so that it does not seal against end wall 137 to isolate the annular edge of the enlarged portion 145, from the pressurised fluid to the right of disc member 140.

Exit port 143 leads to a ratio control valve (not shown) which regulates the pressure applied to the ratio actuator 127, by reducing the pressure from the source in variable degree to produce the required ratio of the variable ratio unit. Upstream of valve 133 the end-load actuator is connected to the conduit leading from the pressure source to entry port 141. The pressure reduction produced by the ratio valve is conveyed upstream through the system so that the same reduced pressure is applied to the end-load actuator.

When ratio actuator 127 approaches the left hand end of its stroke, bar 132 makes contact with the right hand end of rod 139 and moves the movable member 135 to the left. After a small amount of such movement, disc member 140 starts to cover groove 142 so as to constrict the path to exist port 143. The pressure starts to rise upstream of the constriction at groove 142 and to fall downstream of it so that a pressure differential builds up between the two faces of disc member 140 urging it to the right. Ultimately the force driving actuator piston rod to the left is equalled by the force due to the rising pressure acting on the left hand face of disc member 140 and the actuator piston rod 128 comes to rest. The pressure acting on the left hand face of disc member 140 is translated upstream of valve 133 to the end-load actuator.

The pressure level at which the piston rod 128 is arrested depends upon the effective piston area of disc member 140 and is lower the larger that piston area. If that piston area is the same as that of the piston of the ratio actuator (acting rightwards) then the pressure level at which movable member 135 is brought to rest is the same as the pressure which would have had to be applied to the piston of ratio actuator 127 to produce the same effect of arresting the leftwards movement of piston rod 128. If the area of the piston of ratio actuator 127 and the piston area of the end-load actuator have been proportioned on the principles described above the end-load actuator pressure produced by the operation of valve 133 when it has arrested piston rod 128, will be in the same proportion to the force driving piston rod 128 to the left as it would have been had ratio actuator 127 itself been responsible for arresting piston rod 128. If this force arises from roller torque reaction therefore, as will generally be the case, the pressure built up upstream of valve 133 when operated to the point at which piston rod 128 is arrested, will be in the correct proportion to that torque reaction and this pressure will be the correct pressure when applied to the end-load actuator to keep the discs and rollers of the variable unit in driving engagement. If the piston area of disc member 140 is a little below that of the actuator piston then the valve 133 will, on operation by bar 132, give rise to a pressure in the end-load actuator a little above the optimum valve.

If instead of an end-stop valve such as 133 a purely mechanical stop had been applied to piston rod 128 or to any other part of the linkage to the roller mountings, the feedback loop by which appropriate pressures are supplied to the ratio actuator is defeated and though a pressure in the correct proportion to torque reaction might happen to obtain in the ratio actuator and the end-load actuator, there is no guarantee that this will be the case and too low a pressure in the end-load actuator could cause catastrophic slipping of the rollers on the discs.

When there is a tendency for the rollers to overshoot the disc surfaces at the high ratio end of the variable unit range, on a torque reversal due to cutting off the fuel supply to the prime mover, the forces driving the actuator towards the high ratio attitude will be torque reaction forces and the valve will again operate to provide the correct end-load to cope with the torque reaction and prevent disc/roller slipping.

It is an important feature of the use of an end-stop valve according to the invention that although it produces forces tending to repel the ratio actuator from the ends of its stroke which might conceivably be provided by the ratio actuator itself given a suitable instruction for the purpose by a ratio control system programmed to recognise a situation where the actuator is running towards an end of its stroke, such overshoot protection is inevitably at the mercy of the response time constant of the system whereas the end-stop valve of the invention acts when the ratio actuator physically approaches the danger point, rather than the alternative of recognising the circumstances when such a situation might arise and computing a suitable response through the normal ratio control system. However effective the latter expedient might be in normal circumstances, there are several abnormal circumstances, particularly in a road vehicle application, such as running on to or off ice, intermittent wheel spin in mud or snow, etc., which would on occasions defeat the most sophisticated ratio control system.

Given that provision needs to be made for roller overshoot at both ends of the ratio range, due to torque reversals on the overrun, it is preferable to provide end stop valve means which operate at each end of the ratio actuator stroke. FIG. 7 illustrates such a system.

Owing to the torque reversals occurring on changing from one regime to the other, in a synchronous two regime system such as is illustrated diagrammatically in FIG. 4, it is necessary to use a double-acting ratio actuator such as is shown in FIG. 7. A common piston rod 128, 128a has pistons 146, 147 at each of its ends, housed respectively in cylinders 148 and 149. End-stop valves 150 and 151 are of the same general form as end-stop valve 133 of FIG. 6 but to save space they are hollowed out and the piston rods 128 and 128a pass through them. The rod 139 of FIG. 6 becomes a tube 152 for valve 150 and 153 for valve 151.

The valve body 134 of FIG. 6 becomes two valve bodies, one being a part of the cylinder assembly 148 and the other being a part of the cylinder assembly 149. In a practical design of course these valve bodies would be separate items fixed by any convenient means to the cylinders 148 and 149 and would themselves consist of separate parts similarly joined together to facilitate assembly.

Between the two piston rods 128 and 128a there is a cross-head 129 which has a gap 154 between two shoulders 155 and 156 which receives the peg 131 fixed to the end of lever 51 of the roller ratio control linkage (see FIG. 1).

The operation of each of the valves 150 and 151 is the same as that of valve 133 illustrated in FIG. 6 and the reference numerals of FIG. 6 are repeated in FIG. 7 for corresponding items but are primed in the case of valve 151.

A problem arises with the use of two discrete end-stop valves, of avoiding the short-circuiting of the one by the other, since only one of the valves 150 and 151 is operating at any one time. This problem is solved in the FIG. 7 embodiment, by the expedient of connecting the two valves hydraulically in series. An hydraulic conduit 157 connects the exit port 143 of valve 150, to the entry port 141' of valve 151 and exit port 143' of valve 151 is connected to the ratio valve (not shown). Thus, when one valve is operated the other provides a straight-through path and does not interfere with its operation.

Valve 150 is operated when shoulder 155 makes contact with tube 152 and valve 151 is operated when shoulder 156 makes contact with tube 153.

Figures 8, 8A:
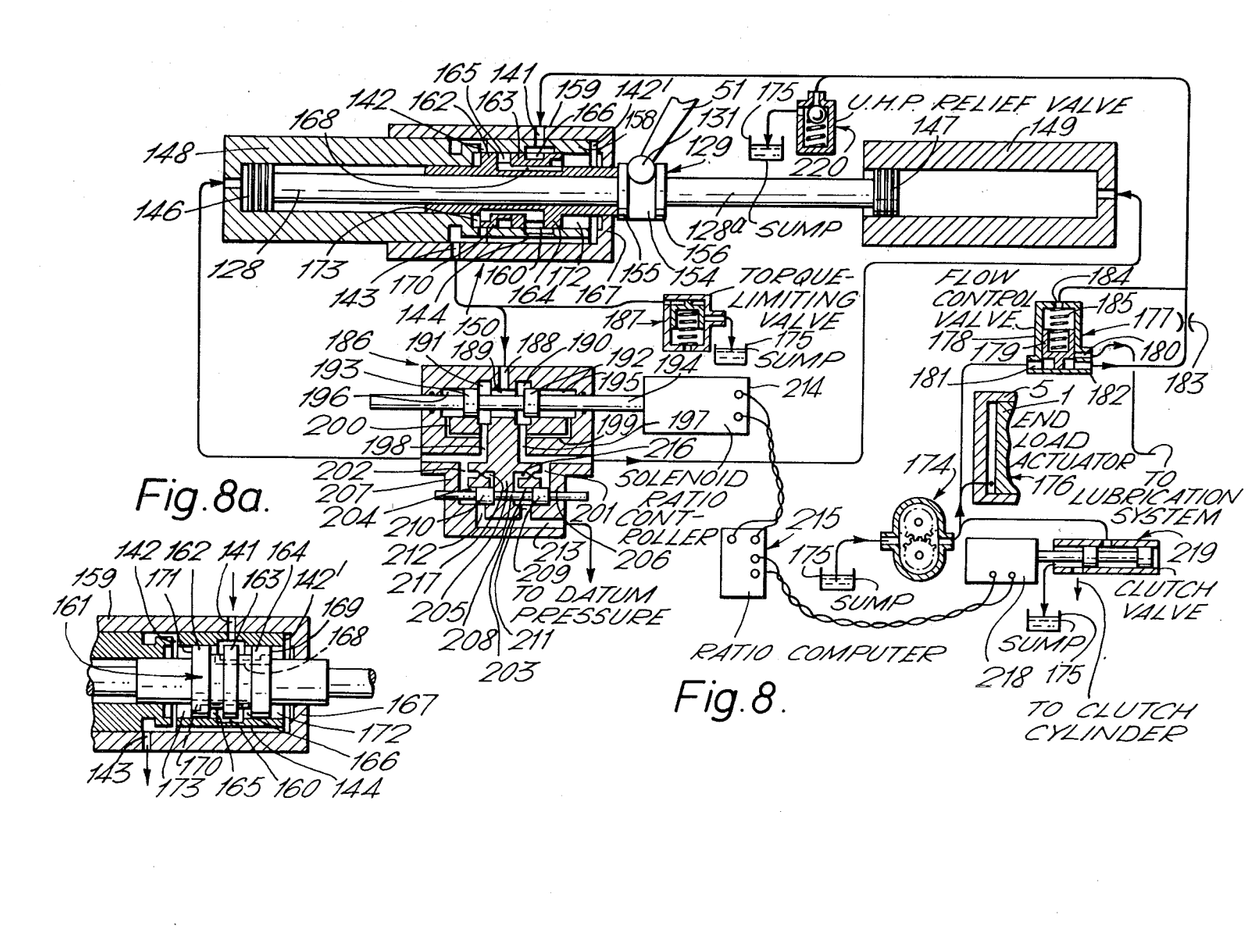
FIG. 8 shows another alternative end stop valve according to the invention together with a partly schematic representation of a ratio control system for the transmission system of FIG. 1.
FIG. 8A is an inset figure showing the end stop valve of FIG. 8 at a different setting.

FIG. 8 shows a somewhat more sophisticated single end-stop valve operable at either end of the actuator stroke. This figure also shows, schematically, the principal components of the hydraulic part of the ratio control circuit.

The reference numerals of the earlier figures are again used in FIG. 8, for corresponding items.

A composite valve body consists of a part 158 which is an extension of or integral with cylinder 148, and a sheath part 159 surrounding part 158. A gap between cylinder 148 and part 158 provides a circumferential channel corresponding to groove 142 of FIG. 7 and a gap between part 158 and an in-turned flange 167 of sheath part 159 provides a circumferential channel corresponding to groove 142 of FIG. 7. Entry port 141 is located in the centre of a groove 160 cut into the inner surface of valve body part 158.

The movable part of the valve consists of a spool 161 which is shown unsectioned in inset FIG. 8A. The spool 161 has three lands 162, 163 and 164, separated by two circumferential grooves 165 and 166.

Spool 161 has tubular extensions which pass through seals in cylinder 148 and the in-turned flange 167 of sheath part 159.

Groove 165 communicates with an end-chamber 172 via a drilling 168 which runs axially of spool 161 to emerge at the annular right hand end face 169 of land 164. Groove 166 similarly communicates with an end-chamber 173, via a drilling 170 which runs axially through spool 161 to emerge at the left hand annular end face 171 of land 162.

Drillings 168 and 170 are shown in dotted lines in inset FIG. 8A. Inset FIG. 8A shows spool 161 in its central position. The pressure at entry port 141 is conveyed via groove 160 and drilling 168 into the end-chamber 172 to the right of land 164 and also via drilling 170 into the end-chamber 173 to the left of land 162. The forces acting axially on spool 161 are therefore in balance. The same applies if the spool moves to right or left to move, respectively, groove 166 out of communication with groove 160 or to move groove 165 out of communication with groove 160, since the pressures in chambers 172 and 173 are equalised via transfer port 144 so long as groove 142 is not obstructed by land 162 nor groove 142 by land 164, should spool 161 drift to the left or the right, respectively. Any such obstruction would immediately give rise to a pressure differential between chambers 172 and 173 which would force spool 161 back towards its central position.

FIG. 8 shows spool 161 forced to the left by shoulder 155 of cross-head 129. In this position the left hand outer edge of land 162 is constricting groove 142. Groove 165 of spool 161, has moved out of communication with the source pressure obtaining in groove 160, so cutting off the access of this pressure to end-chamber 172 via drilling 168. End-chamber 172 is connected by transfer port 144 to a point down-stream of the constriction. The pressure in end-chamber 172 therefore falls whilst the pressure in end-chamber 173, which is upstream of the constriction, starts to rise to the point at which the force acting to the right on the piston area represented by the left hand annular end face of land 162, due to this rising pressure in end-chamber 173, balances the force from shoulder 155. This latter force will generally arise from torque reaction at the rollers and so the pressure in end-chamber 173, which is reflected upstream through the system to the end-load actuator cylinder space 18 (see FIG. 1), is the same as would have balanced the same torque reaction force if such pressure had been applied to actuator piston 146, assuming that the areas of piston face 171 of land 162 and of piston 146 are equal. This pressure, due to the proportioning of the piston areas of ratio actuator piston 146 and of the piston element (disc 1, FIG. 1) of the end-load actuator, previously explained, gives the correct end-load to support the roller torque reaction in question. It might appear from this that the same end-stop effect could have been obtained by applying the appropriate pressure to piston 146. This is not the case however since the end-stop valve of the invention is positioned so that it acts to constrict the pressure flow through exit port 143 in a definite position a little short of the danger point at which the rollers would overshoot the disc surfaces and a very small further movement of the roller mountings, with a corresponding further movement of shoulder 155 would cause a very sharp rise of the pressure in chamber 173 which would rapidly bring shoulder 155 to rest. To produce the same effect by applying a suitable pressure to actuator piston 146 would necessitate some means of recognising the danger point in the ratio change motions of the roller mountings and some means of computing the pressure required to bring shoulder 155 to rest, (i.e. a measurement of the instantaneous torque reaction) and the digestion of this information by the ratio control computer circuit to provide the required pressure and apply it instantaneously to piston 146 and to the end-load actuator. This would be a possible, but difficult and possibly unreliable, solution of the problem.

It will be apparent, from a study of FIGS. 8 and 8a, that end-stop valve 150 is symmetrical about the axial centre point; thus when spool 161 is operated to the right by the right hand face of piston 146, at or near to the rightward end of the range of action of the ratio actuator, the valve operates in the same way as previously described in relation to leftwards operation by shoulder 155. The constriction of the flow to ratio valve 186 will occur at groove 142 however and will be effected by land 162 of spool 161.

The ratio control system shown in FIG. 8 comprises a positive displacement pump 174 driven from input shaft 3 (see FIG. 1) drawing fluid from a sump 175. The delivery from pump 174 is applied directly to the end-load actuator 176 and to a flow control valve 177 which consists of a cylinder 178 and a piston 179 riding within it. Piston 179 is spring-loaded downwards so that its lower edge does not quite obscure a relief port 180 but it is arrested by a peg projecting downwards from its lower face so that it cannot obstruct an entry port 181 nor an exit port 182. Flow from exit port 182 passes through a restrictor 183 and thence to entry port 141 of end-stop valve 150. Down-stream of restrictor 183 a tapping is taken from the flow line to a port 184 above piston 179. The rate of spring 185 which loads piston 179 downwards is chosen so that the pump delivery, even at low pump speeds, will hold piston 179 in a position such that a significant flow of fluid passes through relief port 180 and this flow is utilised for lubrication of the variable ratio unit.

Should the flow through restrictor 183 rise due to an increased flow through end-stop valve 150 and ratio valve 186, which would generally be caused by an increase in the speed of input shaft 3 and thus of pump 174, then there will be a pressure difference across restrictor 183 so that the pressure above piston 179 will fall and the pressure below piston 179 will rise, forcing piston 179 upwards to increase the flow through relief port 180. As a result of this the flow through end-stop valve 150 and ratio valve 186 will be held substantially constant.

The fluid flow from exit port 143 of valve 150 passes to ratio valve 186 but a torque limiting valve 187 is tapped off the fluid line to ratio valve 186. Valve 187 is a straightforward pressure "blow-off" valve, spring loaded tp "blow-off" at a certain pressure. The purpose of this valve is to avoid the near-infinite output torque levels which can arise when, in the First Regime, the ratio of the variable unit is near to the neutral ratio (see FIG. 5) and when a high torque is applied by the prime mover to input shaft 3 (see FIG. 1). It requires a high force from the ratio actuator to move the rollers from the neutral ratio, under such conditions and if this force is not forthcoming the rollers will move back towards the neutral ratio due to the high torque reaction obtaining in these circumstances. If the pressure which can be applied to the ratio actuator is limited then the torque which can exist in the variable unit is also limited and it is the purpose of torque-limiting valve 187 to apply such a limit.

The limit should be a little above the pressure required to be applied to the ratio actuator to resist the highest torque reaction which can exist in the Second Regime at the low ratio end of the ratio range.

Ratio valve 186 has an entry port 188 leading to a bore 189, in the surface of which there are two circumferential grooves 190 and 191, one on each side of the point where entry port 188 meets bore 189. Two lands 192 and 193, of a spool 194 are a sealing fit in bore 189 and are spaced apart axially more widely than are grooves 190 and 191, so that in no position of spool 194 are grooves 190 and 191 wholly obscured by lands 192 and 193 simultaneously.

The end stalks of spool 194 pass, in sealing relation, through end walls of bore 189 so as to provide two chambers 195 and 196, one on the right hand side of land 192 and the other on the left hand side of land 193. Exit ports 197 and 198 lead from grooves 190 and 191, respectively. Port 197 leads to actuator cylinder 149 and port 198 leads to actuator cylinder 148. A transfer port 199 leads from exit port 197 to chamber 195 and a transfer port 200 leads from exit port 198 to chamber 196. Relief ports 201 and 202 lead respectively from exit ports 197 and 198 to the end of a bore 203 and of another coaxial bore 204, these bores being separated by a wall 105. The outer ends of the bores 203 and 204 are closed by walls 206 and 207 respectively. A stalk of a spool 208 passes in sealing relation through walls 206, 205 and 207. Spool 208 has two lands 209 and 210 which are spaced apart so that land 209 is in contact with wall 203 when land 210 is in contact with wall 205. Two escape ports 211 and 212 lead from bores 203 and 204 respectively. Port 211 is located along bore 203 so that it is closed by land 209 when spool 208 is displaced fully to the left and escape port 212 is closed when spool 208 is disposed fully to the right (it is shown in this position in FIG. 8).

Escape ports 211 and 212 merge into a single discharge port 213 which discharges via a datum valve (not shown) which is of the same general form as torque-limiting valve 187 but which is biassed to discharge to sump 175 when the pressure reaches a datum value only a little above ambient pressure. The right hand stalk of spool 194 is extended to connect with a solenoid ratio controller 214 which forms the interface between ratio valve 186 and an electronic ratio computer 215.

Various inputs are supplied to ratio computer 215, e.g. input speed and output speed of the variable unit (from which instantaneous ratio can be computed) and the setting of the fuel supply member of the prime mover. The detailed form of the ratio computer is no part of the invention however and it is only necessary to state that it supplies to solenoid ratio controller 214 an energising current representing a required ratio which it has computed.

Spool 194 is biassed in one direction or the other by the pressure differential between end chambers 195 and 196 acting on the axially outer faces of lands 192 and 193 respectively, this pressure differential being determined by the positions of these lands in relation to exit ports 197 and 198 respectively which communicate with end chambers 195 and 196 via transfer ports 199 and 200 respectively.

In FIG. 8, spool 194 is shown approaching its most leftward position (stops, not shown, limit the axial travel of spool 194).

When spool 194 moves from a central position, in which grooves 190 and 191 are obscured partly, and to the same extent, by lands 192 and 193, a pressure differential occurs between end chambers 195 and 196 which biasses spool 194 in an axial direction resisting such motion. Thus it requires a predetermined current flowing in solenoid ratio controller 214 to move spool 194 to a given position.

The same differential pressures are applied via relief ports 201 and 202 to chambers 203 and 204 so that spool 208 is "flipped" to its end position on the side supplied with the lowest pressure. In FIG. 8 spool 208 is shown "flipped" to the right. Thus spool 208, in co-operation with bores 203 and 204 constitutes a bistable valve or "flip-flop", to borrow from the electronic arts, a term applied to bistable devices.

On the initiation of the movement of spool 194 to the position shown in FIG. 8, the pressure would rise in port 198 and fall in port 197 which would immediately "flip" spool 208 into the position shown in FIG. 8. In this position of spool 208 land 210 obscures all communication between exit port 198 (via relief port 202) and escape port 212. Relief port 201 is also closed by land 209 but there is communication between relief port 201 and escape port 211 via a bypass port 216 leading from relief port 201, via bore 203 (adjacent to wall 205), to escape port 211. A similar bypass port 217 connects relief port 202, via bore 204 (adjacent to wall 205), to escape port 212, but this is obscured by land 210 with spool 208 in the position shown in FIG. 8.

The effect of spool 208 "flipping" to the right is to put groove 190 into communication via bypass port 216 with the datum pressure existing at port 213. Cylinder 149 is also in communication with the datum pressure and is able to drain down via ports 210, 216, 211 and 213.

As spool 194 moves further to the left the portion of the flow passing to the datum pressure point via ports 197, 201, 216, 211, 213 is reduced so that the pressure between lands 195 and 196 rises. This pressure is applied to cylinder 148 via port 198. Spool 194, bore 189 and grooves 190 and 191 thus act as a pressure "potentiometer", increasing the pressure in cylinder 148 as spool 194 moves to the left and reducing it as spool 194 moves to the right. Reference to FIG. 5 shows that leftward displacement of spool 194 and the energisation of cylinder 148, is required for reverse drive in the First Regime and forward drive in the Second Regime.

If spool 194 moves to the right from the central position, spool 208 "flips" to the left and the performance of ratio valve 186 is the mirror image of that described above in relation to leftward motions of spool 194. Ratio actuator cylinder 149 will then be pressurised and cylinder 148 drained down to datum pressure. These conditions are required for forward drive in the First Regime.

In FIG. 8, flow restrictors are shown in bypass ports 216 and 217. These are inserted to assist the "flipping" of spool 208. If for instance it is required that spool 208 should move to the left from the position shown in FIG. 8, there will be a pressure differential across land 209 due to the restricting flow through bypass port 216 urging spool 208 to the right. It is possible to dispense with these restrictors in the bypass ports 216 and 217 however.

The change-over from leftward to rightward movement of spool 194, and vice versa is brought about by reversing the polarity of the current supply to solenoid ratio controller 214, and this is effected by ratio computer 215. Simultaneously with this a signal is passed from ratio computer 215 to a solenoid clutch controller 218 to operate a clutch valve 219 supplied with pressurised fluid from pump 174 which is supplied to the clutch cylinder 86 (see FIG. 1) when the spool of valve 219 is displaced to the left and when this spool is displaced to the right (as shown in FIG. 8) clutch cylinder 86 is drained down to sump 175 so that the clutch disengages.

The dogs 121 are engaged with planet carrier part 114, to block the overrun condition of unidirectional clutch 89 (see FIG. 4), to enable reverse drive to be achieved, by means of a manual lever control rather than by a signal from ratio computer 215. Nevertheless computer 215 has to be conditioned by movement of this lever, to ensure that ratio actuator cylinder 148 is pressurised and clutch 89 disengaged. The latter must not obtain with cylinder 148 pressurised for forward drive in the Second Regime.

When end-stop valve 150 operates, in one direction or the other, the flow to ratio valve 184 is almost cut off from the normal fluid supply at entry port 188 and the ratio actuator cylinders 148 and 149 have an effect so small that it can be ignored.

When the end-stop valve operates to constrict the fluid flow, as described above, the pressure up-stream of the constriction will generally move quickly but steadily to the value required to arrest the ratio actuator. It is possible however, in the presence of shock loads on the transmission system for example, for the valve to be momentarily driven into the condition where it blocks the flow entirely, causing a pressure surge up-stream of the valve which might wreck the pump and/or damage the discs and rollers by applying an excessive end-load. To guard against such occurrences an ultra-high pressure relief valve 220 is connected to the fluid supply line leading to valve 150. Valve 220 is a straightforward safety valve discharging to sump 175 when the pressure in the said fluid supply line reaches a chosen level, exceeding by a substantial margin the maximum required for the normal operation of the system.

The control system must provide means for engaging and disengaging clutch 89, (see FIGS. 1 and 4), at the correct instant, i.e. when the synchronous ratio is reached in the course of a rise or a fall in the overall ratio of the system. There are several possible methods for recognising the occurrence of the synchronous ratio and for guarding against "hunting" between the First Regime and the Second Regime under fluctuating conditions. In the system illustrated in FIG. 8 the timing of the engagement and disengagement of clutch 89 is entrusted to the ratio computer 215 which passes a signal at the appropriate instant, to solenoid clutch controller 218 as previously described.

In some arrangements of the type illustrated in FIGS. 1 to 4 it is preferred to use a normal hydraulically operated brake in place of the unidirectional brake 118/115. In this case an additional valve similar to valve 219 is required to energise and release this brake and as provision has to be made to take account of engagement and release lags of devices of this kind it may be necessary to provide a separate solenoid brake controller, similar to solenoid clutch controller 218 but supplied from a separate outlet on ratio computer 215.

In a vehicle application it is desirable to have some means of driving the vehicle back to base or to the nearest repair facilities in the event of malfunction of the control system, the ratio computer 215 in particular. This facility may be provided by a simple manually-operated valve which: (1) Drives spool 194 fully to the valve. (2) Cuts off the fluid supply from ratio valve port 198 to cylinder 148. (3) Cuts off the fluid supply from pump 174 to clutch valve 219. (4) Where a hydraulic brake is used in place of unidirectional brake 118/115, energises the brake valve corresponding to clutch valve 219.

The vehicle could then be driven forwards in First Regime but not in reverse. As an added refinement a further valve operated by the "Forward/Reverse" manual selector level could transfer the cut-off of cylinder 148 mentioned in "(2)" above, from cylinder 148 to cylinder 149.

Although the invention has been described in relation to transmission units of the toroidal race rolling traction type, it can in fact be used with other types of continuously-variable ratio transmission units such as the type using a chain or belt with variable diameter driving and driven sprockets or pulleys, and where an hydraulic actuator is used to force the interengaging elements into driving contact and another hydraulic actuator is used to vary the ratio in dependence on driving torque reaction and where there is a predetermined relationship between the forces applied by the two actuators. The end-stop valve of the invention would be actuated by mechanical parts of the linkage by which the ratio is changed, when an extreme end of the ratio range is approached.

I claim:

1. A control system for a steplessly variable ratio transmission unit of the type having an input disc and an output disc which have facing surfaces forming part of a torus and which are mounted for rotation about a common main axis, there being at least one roller in driving engagement with the toroidal surfaces of the discs, the or each roller having a mounting permitting it to swivel about a ratio change axis substantially tangential to the centre circle of the torus of which the surfaces of the discs form part, whereby the speed ratio between the input and the output disc may be changed, the roller mounting also permitting limited bodily translation of the roller substantially along the line of the ratio change axis whereby a change in the said ratio is initiated, any translational position of the roller mounting along this line having a corresponding equilibrium ratio, the transmission unit comprising also a ratio actuator coupled to the roller mountings opposing the driving torque reaction of the rollers, an end-load actuator urging the discs together into driving engagement with the or each roller, a source of pressurised fluid for the ratio actuator and the end-load actuator, the control system comprising a ratio control valve which valve is operable to control the fluid pressure from the source to a required extent to produce a required ratio by means of the ratio actuator and a corresponding end-load on the discs by means of the end-load actuator the control system further comprising end-stop valve means operable, via a mechanical connection, by the ratio actuator at or near to one end at least of its permissible stroke, to constrict the fluid connection to the ratio control valve so that the pressure from the source is no longer solely under control of the ratio control valve and rises up-stream of the end-stop valve meaans, which comprises a cylinder space and a movable member the fluid pressure from the source being introduced into the cylinder space, the rising pressure on operation of the end-stop valve means, acting in the said cylinder space upon a piston face of the movable member in a sense urging the ratio actuator away from the end of its stroke, the end-load actuator being connected to the pressurised fluid source up-stream of the end-stop valve means.

2. A control system as claimed in claim 1 in which the end-stop valve means comprises a casing with a cylindrical bore and a spool received within the bore and having land means riding in sealing relation within the bore and co-operating with the casing to define two chambers one on each side of the land means to which chambers the land means presents equal piston areas, an inlet port and an exit port communicating with one of the chambers, a transfer port interconnecting the exit port and the other of the chambers whereby the fluid from the source acts equally on both sides of the land means when the spool is central within the bore, the ratio actuator, when it approaches the the end of its stroke, operating the spool towards the first-mentioned chamber so that the land means obstructs the exit port, whereupon the pressure within the second-mentioned chamber falls and the pressure in the first-mentioned chamber rises thus urging the ratio actuator away from the said end of its stroke by means of the said mechanical connection.

3. A control system as claimed in claim 2 having two end-stop valves, one operable at one end of the stroke of the ratio actuator and the other end of that stroke, a fluid connection between the pressurised fluid source and the inlet port of one of the valves, a fluid connection from the exit port of the said one valve to the inlet port of the other valve, and a fluid connection from the exit port of the said other valve to the ratio control valve whereby the two end-stop valves are connected in series between the said source and the ratio control valve.

4. A control system as claimed in claim 2 in which the spool of the end-stop valve has a central bore running through it, through which is threaded a piston rod of the ratio actuator the spool having a tubular portion extending on both sides of the land means, the said piston rod having an abutment located so as to engage the said tubular portion when the ratio actuator approaches an end of its stroke.

5. A control system as claimed in claim 1 in which the end-stop valve is operable at either end of the stroke of the ratio actuator and comprises a spool received within a casing the spool having three lands, namely a first land, a second land and an intermediate land, separated by a first groove between the first land and the intermediate land and a second groove between the second land and the intermediate land, the said casing having a bore within which the said land of the spool ride in sealing relation, this bore defining a first end chamber bounded in part by the face of the first land remote from the first groove and a second end chamber bounded in part by the face of the second land remote from the second groove, there being a first passage within the spool between the second groove and the said face of the first land and a second passage within the spool between the first groove and the said face of the second land, exit ports from the first end chamber and the second end chamber and connections from such ports to the ratio control valve, the said bore having an inlet groove and a fluid connection thereto from the fluid pressure source, the inlet groove being wider than the intermediate land so that, when the latter is central in relation to the former, both end chambers are in communication with the fluid pressure source via the first passage and the second passage but only one of the end chambers is in such communication when the spool moves towards that end chamber to obstruct the exit port from that end chamber and, by means of the intermediate land, to isolate the first groove or the second groove, as the case may be, from the inlet groove.

6. A control system as claimed in claim 1 in which the said piston face of the end-stop valve has an effective area substantially equal to and not greater than the effective area of the ratio actuator piston.

* * * * *

Disclaimer 4,297,918.—*Forbes G. deB. Perry,* Forest Row, England. CONTROL SYSTEMS FOR STEPLESSLY-VARIABLE RATIO TRANSMISSIONS. Patent dated Nov. 3, 1981. Disclaimer filed Nov. 4, 1982, by the assignee, *National Research Development Corp.*

Hereby enters this disclaimer to claims 4 and 5 of said patent.
[*Official Gazette February 8, 1983.*]